Jan. 4, 1949.  P. C. MALMSTEN  2,457,907
CLUTCH AND BRAKE DEVICE
Filed Sept. 23, 1946  3 Sheets-Sheet 1
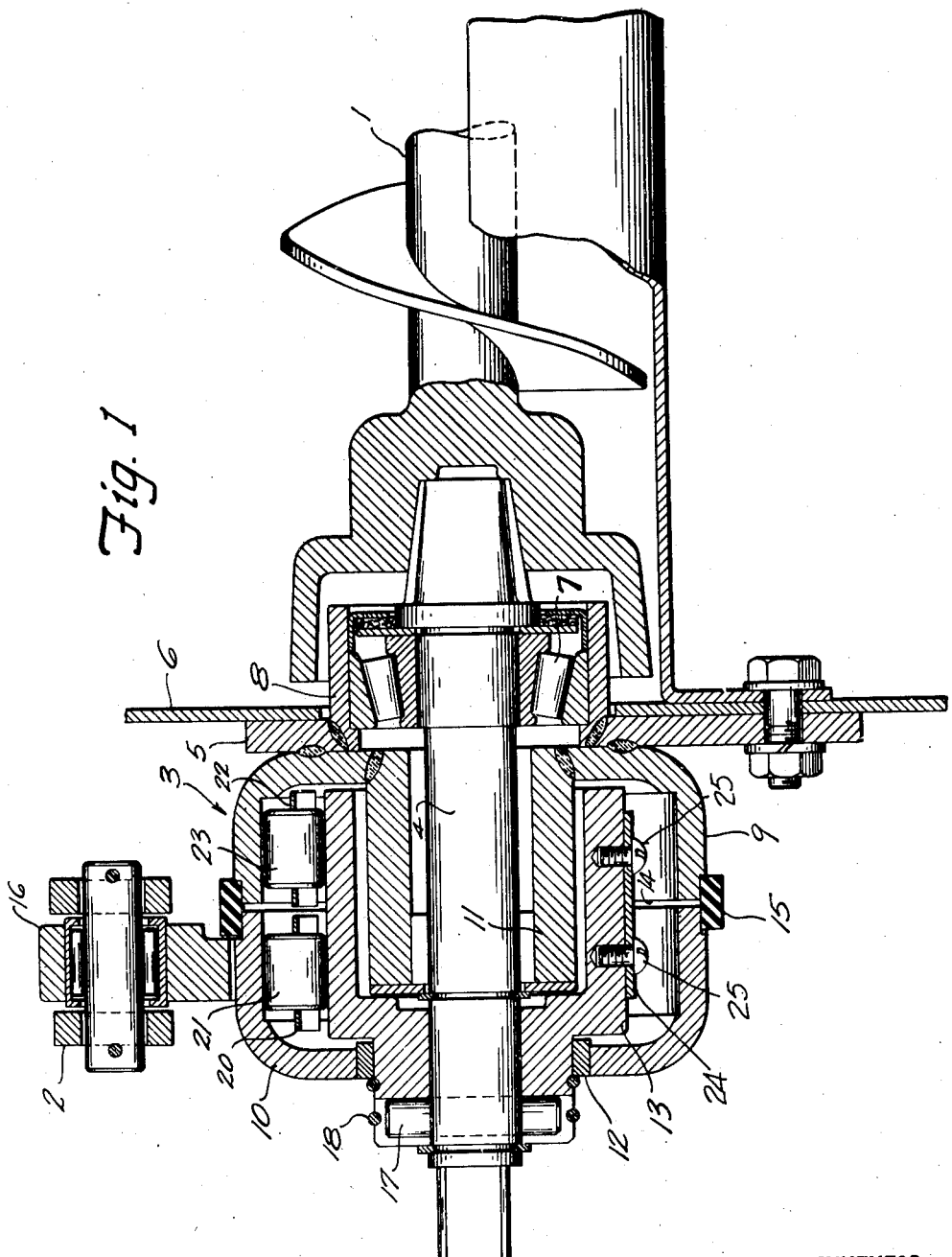
INVENTOR.
Philip C. Malmsten
BY
Attorney Jan. 4, 1949. P. C. MALMSTEN 2,457,907
CLUTCH AND BRAKE DEVICE
Filed Sept. 23, 1946 3 Sheets-Sheet 2
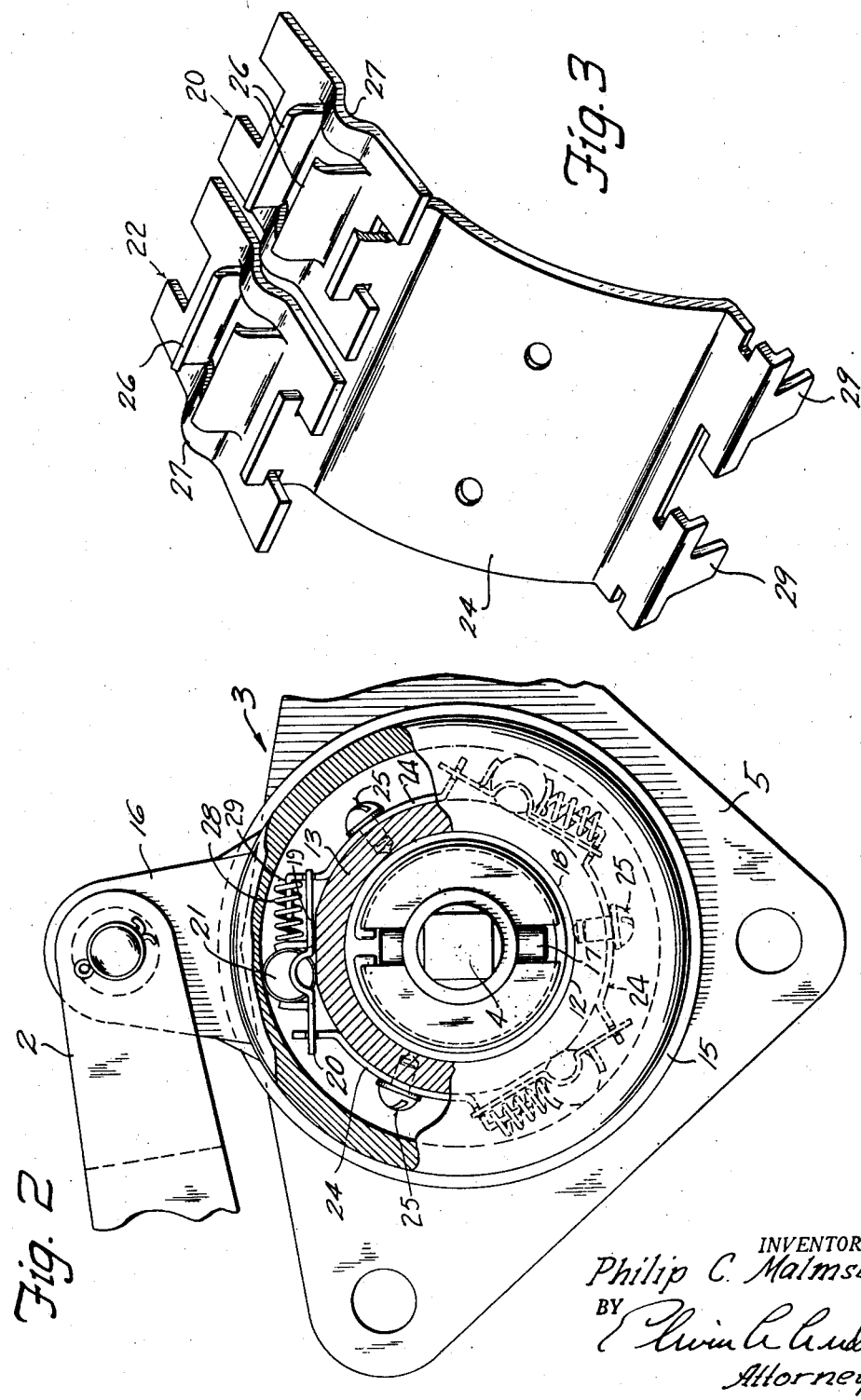
INVENTOR.
Philip C. Malmsten
BY
Attorney Jan. 4, 1949.  P. C. MALMSTEN  2,457,907
CLUTCH AND BRAKE DEVICE
Filed Sept. 23, 1946   3 Sheets-Sheet 3
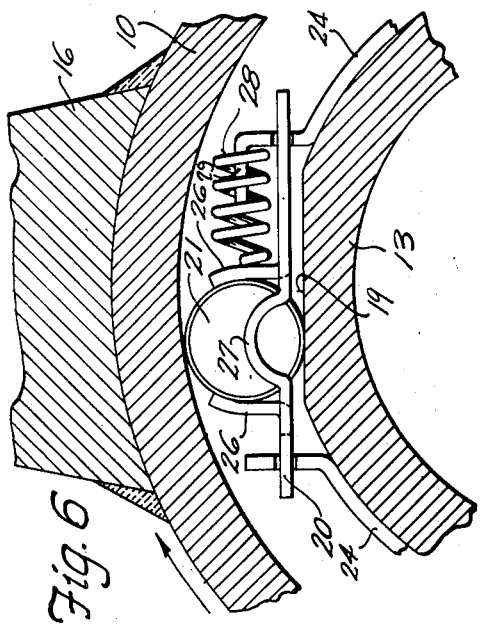
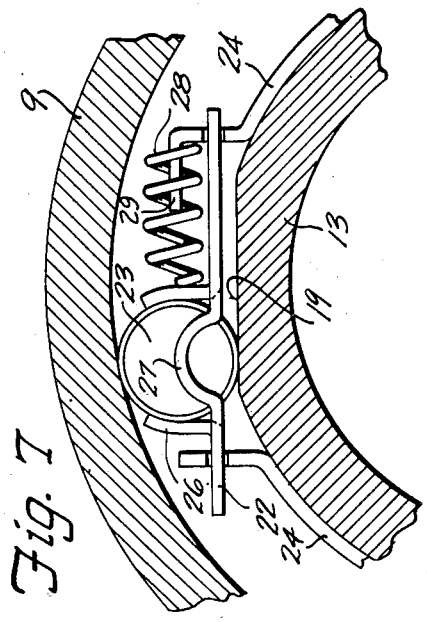
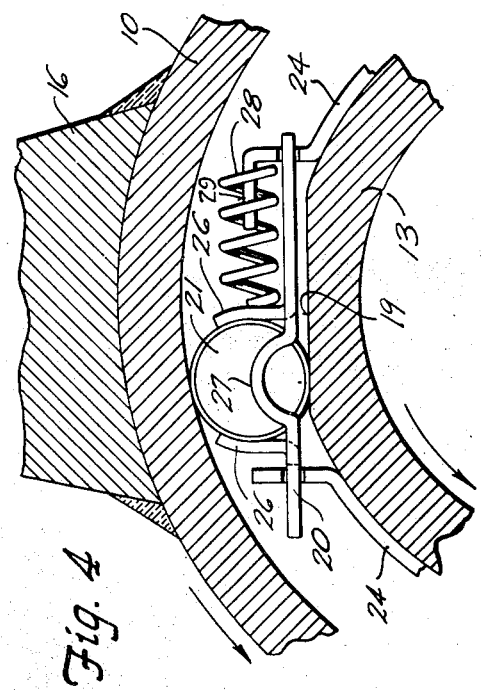
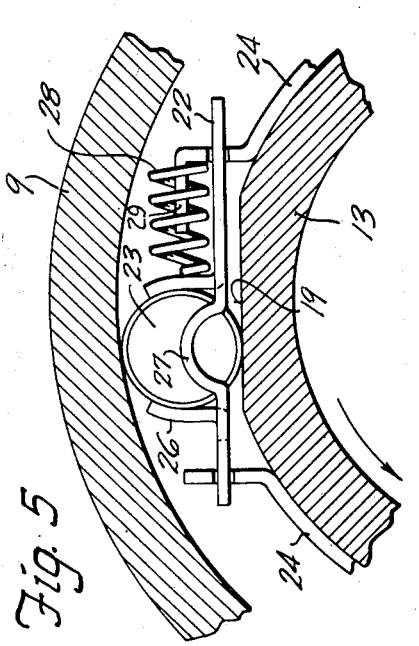
INVENTOR.
Philip C. Malmsten
BY
Attorney Patented Jan. 4, 1949

2,457,907

UNITED STATES PATENT OFFICE 2,457,907

CLUTCH AND BRAKE DEVICE

Philip C. Malmsten, Milwaukee, Wis., assignor to A. O. Smith Corporation, Milwaukee, Wis., a corporation of New York Application September 23, 1946, Serial No. 698,651

1 Claim. (Cl. 192—12)

This invention relates to a clutch for stokers and has particular reference to a clutch for stokers which is employed in intermittently driving the stoker feed screw.

One object of the invention is to provide a clutch for a stoker which is substantially noiseless and void of drag.

Another object is to provide separate driving and holding rolls to prevent reversal of the stoker worm after a stroke has been completed.

Another object is to provide a simple cage construction for holding the rolls in place.

Another object is to provide a clutch for a stoker which is readily assembled and disassembled and fabricated at generally low cost.

These and other objects of the invention will appear hereinafter in connection with the following description of the drawings illustrating an embodiment of the invention.

In the drawings:

Figure 1 is a longitudinal sectional view of the clutch assembly of a stoker;

Fig. 2 is an end view of Figure 1 with parts broken away and sectioned;

Fig. 3 is an enlarged perspective view with parts broken away and sectioned of the cages for holding a pair of driving and holding rollers with the bracket for securing them in place;

Fig. 4 is a detail section showing the driving roll when the clutch is driving;

Fig. 5 is a section similar to Fig. 4 showing the holding roll when the clutch is driving;

Fig. 6 is a detail section showing the driving roll when the clutch is returning from the driving stroke; and Fig. 7 is a section similar to Fig. 6 showing the holding roll when the clutch is returning from the driving stroke.

Referring to the drawings there is illustrated a portion of a stoker feed screw 1 which is driven intermittently from a transmission and motor, not shown, through the connecting rod 2, the clutch assembly 3 and the spindle 4.

Spindle 4 extends through the bearing plate 5 which is secured to the housing 6 of the stoker, and the inner end of the spindle interlocks with the feed screw 1 to provide the driving connection therebetween. The spindle rotates within bearing 7. Bearing 7 is located within bearing housing 8 which is disposed within the bearing opening of plate 5.

Spindle 4 extends a substantial distance outwardly from plate 5 and stoker housing 6 to receive the clutch assembly 3.

The clutch housing is formed of two generally circular cup-shaped sections 9 and 10. The inner section 9 is welded to the outer face of bearing plate 5 and to the bushing 11 within which spindle 4 rotates. Section 9 is fixed and non-rotatable.

The outer section 10 of the clutch housing is free to rotate or oscillate circumferentially and is assembled on bushing ring 12 which surrounds the outer portion of the cup-shaped clutch ratchet 13 which will be described hereinafter.

Housing section 10 is separated from inner section 9 at the circumferential joint 14 therebetween to permit free oscillation of section 10. Joint 14 is sealed by the rubber gasket 15 which fits within a recess provided at the circumferential joint area of the housing sections.

The bracket 16 extends outwardly from rotatable housing 10 and connecting rod 2 is suitably secured thereto and extends therefrom to the transmission and motor unit, not shown, to rotate the housing.

The clutch ratchet 13 is of generally circular shape and is formed so that the forward portion encircles bushing 11 while the rear portion is directly mounted on spindle 4. The rear portion of ratchet 13 is slotted to receive shear pin 17 which extends transversely therethrough and through a matching aperture in spindle 4 to key the ratchet and spindle together. Pin 17 is held in place by snap ring 18.

The cup-shaped portion of ratchet 13 encircling bushing 11 is provided on the circumferential face thereof with a plurality of flat or cam faces 19 which are equally spaced around the circumference of the ratchet.

The cages 20 and rollers 21 which comprise the drive unit of the clutch are disposed on cam surfaces 19 of ratchet 13 within the oscillating housing section 10. The cages 22 and rollers 23 which comprise the brake unit of the clutch are disposed on cam surfaces 19 inwardly of cages 20 and rollers 21 and within the fixed housing section 9. Cages 20 and rollers 21, and cages 22 and rollers 23 are faced in the same direction circumferentially around the ratchet 13 and are interchangeable.

Cages 20 and 22 are of generally rectangular shape and each of a pair of cages 20 and 22 at one end interlock with a bracket 24 which extends circumferentially around ratchet 13 in one direction, and at the opposite end interlock with a corresponding bracket 24 which extends circumferentially around ratchet 13 in an opposite direction. The brackets 24 are secured to ratchet 13 by screws 25 or the like. The drawings illustrate three sets of cages and driving and holding rollers secured together on ratchet 13 and three corresponding cam surfaces 19.

Rollers 21 and 23 are retained in their respective cages by the transverse ears 26 and side ears 27 but are free to rotate within their respective cages.

Cages 20 and 22 float separately of each other between brackets 24 but are biased in the driving direction of the clutch, shown as counter-clockwise in the drawings, by springs 28. Each spring 28 has one end assembled over the tongue 29 of the bracket 24 to the right of the rollers 21 and 23 as shown in Figs. 4, 5, 6 and 7, and the other end of the spring engages the ear 26 of the cage 20 or 22 to bias the cage in the direction in which the clutch is driving ratchet 13. Sufficient clearance is provided at the interlocking joints between cages 20 and 22 and brackets 24 to leave the cages freedom to float radially.

In the operation of the invention, as connecting rod 2 is pulled downwardly oscillating clutch housing section 10 is rotated thereby in a counter-clockwise direction. With this movement of housing 10 the drive rollers 21 roll counter-clockwise on cam surface 19 and wedge between cam surface 19 of ratchet 13 and oscillating housing 10 and drive ratchet 13 in the direction of movement of housing 10 as illustrated in Fig. 4.

When the clutch is driving as in Fig. 4, the holding rollers 23, as shown in Fig. 5, are slightly to the rear of driving rollers 21 and ride between the fixed housing 9 and cam surface 19. Since housing 9 is fixed, when ratchet 13 rotates, roller 23 is pinched radially in a clockwise direction and cage 22 compresses spring 28. Roller 23 thus rides freely on surface 19 and the inside of housing section 9 without wedging therebetween.

When the clutch is reversed upon return of rod 2 on completion of its driving stroke, ratchet 13 is held against turning. As shown in Figs. 6 and 7, the drive rollers 21 tend to roll in a clockwise direction and compress spring 28 while the holding rollers 23 under the tendency of ratchet 13 to rotate are pinched in a direction opposite to drive rollers 21 and wedge between the ratchet and fixed housing 9 to prevent the ratchet from reversing.

The springs 28 maintain the respective sets of holding rolls and drive rolls in equal engagement with their respective housings and ratchet 13 and thus prevent excessive wear of any one roller by the same doing all the work.

By employing holding rolls separate from the drive rolls, drag on the clutch is prevented and noise is eliminated. The elimination of noise is particularly important in the use of the clutch with stokers.

The construction of the clutch is simple and costs are held to a minimum since the flat cam surfaces of the ratchet are employed for both the driving and holding rolls of the clutch. At the same time the cage, rollers, springs and brackets are interchangeable regardless whether they are employed as driving means or holding means, and therefore can be produced in lots at relatively low costs.

Various embodiments of the invention may be employed within the scope of the accompanying claim.

I claim:

In a clutch unit for communicating intermittent rotary movement to a driven member, a housing encircling said driven member and separated axially of the member into a fixed section and an oscillating section, a cam surface provided longitudinally of said driven member, separate cages disposed on said cam surface with a freely rotatable drive roller confined in one cage beneath the rotatable section of the housing and a corresponding braking roller confined in the other cage beneath the fixed section of the housing, a common bracket securing said cages to the driven member and leaving the cages free to reciprocate independently of each other transversely of said cam surface, and a spring disposed between said bracket and each cage to bias the rolls to wedging action between the cam surface and their respective housing to intermittently drive and brake the driven member upon oscillation of the oscillating housing section.

PHILIP C. MALMSTEN.

REFERENCES CITED

The following references are of record in the file of this patent:

UNITED STATES PATENTS

| Number | Name | Date |
|---|---|---|
| 1,222,712 | Armstrong | Apr. 17, 1917 |
| 1,544,621 | Widmann | July 7, 1925 |
| 1,719,613 | Kohler | July 2, 1929 |
| 2,360,075 | Schoij | Oct. 10, 1944 |